United States Patent [19]
Dent

[11] Patent Number: 6,108,808
[45] Date of Patent: Aug. 22, 2000

[54] APPARATUS AND METHOD FOR DECODING RECEIVED SIGNALS AND LOCALIZATION OF ERRORS THEREIN BY COMPARISON WITH ABERRANT DATA VALUES

[75] Inventor: Peter Richard Dent, Bedford, United Kingdom

[73] Assignee: Texas Instruments Incorporated, Dallas, Tex.

[21] Appl. No.: 07/790,618

[22] Filed: Nov. 8, 1991

[30] Foreign Application Priority Data

Nov. 12, 1990 [GB] United Kingdom ............... 9024515

[51] Int. Cl.[7] .................................................. G06F 11/00
[52] U.S. Cl. .................................. 714/736; 714/30
[58] Field of Search ........................ 371/25.1, 37.8, 371/37.9, 26, 67.1, 68.1, 68.2, 3, 5.2, 37.6, 53; 375/25, 27, 10.4, 34, 115; 379/61, 62, 63, 58; 341/143; 455/21.8

[56] References Cited

U.S. PATENT DOCUMENTS

| | | | |
|---|---|---|---|
| 2,876,418 | 3/1959 | Villars | 341/143 |
| 2,889,521 | 6/1959 | Levine et al. | 329/311 |
| 2,949,505 | 8/1960 | Kretzmer | 375/25 |
| 3,701,144 | 10/1972 | Fineran et al. | 341/159 |
| 3,705,359 | 12/1972 | Kappes | 341/143 |
| 3,761,613 | 9/1973 | Limb | 348/415 |
| 3,810,020 | 5/1974 | Fortuna et al. | 375/25 |
| 3,927,376 | 12/1975 | Ferrie | 375/5 |
| 4,118,686 | 10/1978 | Lender | 340/146.1 |
| 4,291,406 | 9/1981 | Bahl et al. | 371/44 |
| 4,441,185 | 4/1984 | Jungmeister | 371/56 |
| 4,528,591 | 7/1985 | Liepe et al. | 348/572 |
| 4,554,670 | 11/1985 | Aiko et al. | 375/30 |
| 4,571,737 | 2/1986 | Nishitani et al. | 375/27 |
| 4,683,571 | 7/1987 | Yamagishi | 371/37 |
| 4,825,451 | 4/1989 | Schwartz | 375/27 |
| 4,859,872 | 8/1989 | Hyakutake | 307/269 |
| 4,939,749 | 7/1990 | Zurcher | 375/30 |
| 4,968,902 | 11/1990 | Jackson | 307/360 |
| 5,027,358 | 6/1991 | O'Dell et al. | 371/62 |
| 5,058,112 | 10/1991 | Namitz et al. | 371/3 |
| 5,065,395 | 11/1991 | Shenoi et al. | 370/81 |
| 5,097,147 | 3/1992 | Stuebing et al. | 307/354 |
| 5,111,191 | 5/1992 | Povenmire | 345/134 |

FOREIGN PATENT DOCUMENTS

| | | |
|---|---|---|
| 0176218 | 2/1986 | European Pat. Off. . |
| 0207243 | 7/1987 | European Pat. Off. . |
| 1289378 | 9/1972 | United Kingdom . |
| 2092310 | 8/1982 | United Kingdom . |
| 2159645 | 12/1985 | United Kingdom . |

*Primary Examiner*—Dieu-Minh T. Le
*Assistant Examiner*—Pierre E. Elisea
*Attorney, Agent, or Firm*—William B. Kempler; Richard L. Donaldson

[57] ABSTRACT

Decoding apparatus for decoding received adaptive differential pulse code modulation data signals which includes unit for quickly detecting errors in the data values in the form of unallocated values or values which are unlikely to occur. The apparatus is intended for use in cordless telephones to eliminate extraneous and disturbing sound signals which can be generated by the decoding apparatus when the signals received by the telephone become weak and are misread before a cyclic redundancy check circuit detects the error.

6 Claims, 1 Drawing Sheet

APPARATUS AND METHOD FOR
DECODING RECEIVED SIGNALS AND
LOCALIZATION OF ERRORS THEREIN BY
COMPARISON WITH ABERRANT DATA
VALUES

The present invention relates to digital communications, and in particular to decoders for digitally encoded transmission, such as those employed in cordless telephones.

BACKGROUND OF THE INVENTION

Cordless telephone systems are well known, and digitally communicating cordless telephones have been proposed, one such proposal and its implementation being described in U.K. patent Application No. 8907982, having a publication no. 2,218,548. In the arrangement described, adaptive differential pulse code modulation (ADPCM) is employed for bi-directional digital communication between a cordless telephone and a network station. Each transmitter includes an ADPCM encoder, which receives pulse code modulation (PCM) signals, from an analog to digital converter sampling the output of a microphone providing a speech signal to be transmitted, for example, and a formatting arrangement to add appropriate timing and control data to ADPCM samples for transmission. Each receiver includes an ADPCM decoder to provide a PCM output then received ADPCM data for application to a digital to analog converter and an arrangement responsive to received timing and control data to ensure received ADPCM samples for decoding are correctly identified.

As will be appreciated, the coding algorithms which could be used between receiver and transmitter are many and various; however, it is desirable that communication is in accordance with a standard system so that cordless telephones and network stations are inter-operable. One such standard system which has been widely adopted is known in the art as the Cordless Telephone II (CT2), Common Air Interface (CAI), which it is customary to abbreviate to CT2(CAI). Such standards specify, for example, sampling frequency, sample quantizing level, and formatting and control algorithms. CT2(CAI), for example, specifies sampling at 8 KHz, quantizing to 15 levels, and that cyclic redundancy check data be transmitted as part of the added control data so that data transmission errors can be detected and possibly rectified at the receiver.

ADPCM is specified in CT2(CAI) to reduce the required bit rate from 64K bits per second to a more practicable 32K bits per second, and for the most part provides acceptable results. One problem, however, is that the decoder can deliver a squawk when the radio system enters a fade. This is caused by a delay in the detection of prolonged errors by the control circuits; control data transmission is at a relatively low rate and hence the time taken for the control circuits to make the assessment that signal level in the digital data link has fallen below the threshold requirements of the voice coder is significant. The result is that the voice coder gives a loud squawk between entering the fade and the time the data controller recognizes that bad data is being received and takes action to mute the receiving channel. Typically this squawk lasts for a second or so and is noticeably disruptive to normal speech.

Clearly since the root cause of the problem is insufficient data rate in the control channel for the cyclic redundancy check quickly to detect an extended period of errors, a solution exists simply by increasing the rate. This, however, would be a departure from the CT2(CAI) standard and hence is a solution unavailable to the equipment designer. In any case, an increase in control data rate implies a reduction in useful ADPCM data rate, which in itself would be deleterious to communication. The present invention has been made as a result of a search for a solution to the squawk problem without recourse to data rate increase.

SUMMARY OF THE INVENTION

According to the present invention, decoding apparatus for decoding encoded data includes an input for receiving said encoded data, means for comparing received data with a predetermined value, said predetermined value being defined in relation to an aberrant or probably aberrant datum value, said means being arranged to produce an output indicative of an error or likely error in received data in the event that, on the basis of the comparison, an aberrant datum value is or is likely to have been received.

The predetermined value may be an aberrant or likely aberrant itself or a range limit or a value defined, for example arithmetically in relation to any of these.

BRIEF DESCRIPTION OF THE DRAWINGS

In order that features and advantages of the present invention may be more fully appreciated, an embodiment will now be described, by way of example only, with reference to the accompanying diagrammatic drawings, of which.

DESCRIPTION OF PREFERRED EMBODIMENT

Figure 1:
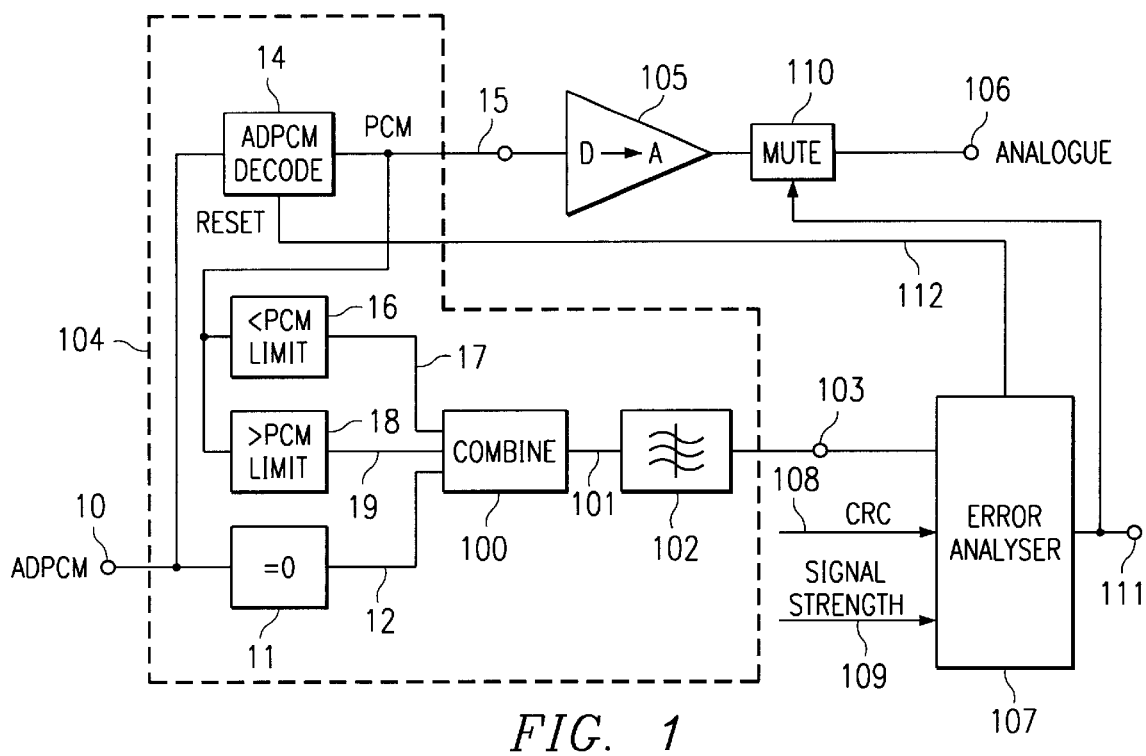
FIG. 1 represents ADPCM apparatus adapted for the CT2(CAI) standard.

The embodiment to be described is adapted for use in compliance with the CT2(CAI) standard. It will be recalled that this standard calls for 15 level transmitted data quantisation in the ADPCM format. This number of levels has been chosen to give a symmetrical response about zero, although 16 levels would be possible with the four bits which need to be transmitted to define the fifteen levels. The unassigned code of the 16 possible is 0000, and if this datum is received for ADPCM decoding at the receiver an error, likely to be a transmission error, has occurred.

In the embodiment, ADPCM data is received at an input 10 and is compared datum by datum with the predetermined value 0 in a comparator 11. The comparator 11 is arranged to provide a normally low output on line 12, except when the code 0000 (value 0) is applied at its input. Under this condition, the comparator produces a high output on line 12 indicative of an aberrant datum (in this case the unassigned code 0000) in the received data.

ADPCM input data is applied to a decoder 14 implementing an appropriate ADPCM decoding algorithm to provide a PCM output at its output on line 15. In PCM systems the range of possible input values must be mapped onto a restricted range of PCM output values, hence if a PCM value is decoded which is outside a range defined by the PCM value range plus the quantisation effects of the coder/decoder arrangement, an error has occurred. For example, the PCM range may be restricted to values between +/− 8191; values inclusively inside this range being accepted as valid, values exclusively outside the range being aberrant. Such values may be further restricted if a companding algorithm is employed. For example, for CT2 (Europe) the quantized range is +/− 3968, obtained by dividing by two, then limiting in accordance with the 9721 standard for A-law companding. Alternatively, in states where u-law companding is employed, the quantized range may be limited to +/− 7903, the relevant 9721 standard.

In a preferred embodiment of the present invention, decoded PCM data on line 15 is applied to a comparator 16 which compares the data, datum by datum, with a value defined to be equal to the lower limit of the expected range of decoded PCM values. The comparator 16 is arranged to provide a low output on line 17 if an input value is above or equal to this lower limit, and a high output indicative of an aberrant received datum if an input value is below the limit. A comparator 18 is similarly arranged to compare PCM data with a value representing the upper range limit to provide a high output on line 19 indicative of an aberrant datum in the event that an input PCM value exceeds the predetermined limit value.

Conceptually, the comparators (11, 16, 18) may be regarded as providing a fixed duration pulse output whenever the true (comparator 11) condition is met or exceeded (comparators 16, 18). Thus, the outputs appearing on lines 12, 17 and 19 have a pulse rate that is proportional to the respective types of aberrant data detected by the comparators. The outputs of the three comparators are combined in a combiner 100 to provide a single pulse train output on line 101, the pulse rate of which is indicative of the frequency of aberrant datum reception.

The pulse rate output on line 101 drives a low pass filter 102 which serves to integrate the pulse train, i.e., the higher the pulse rate, the higher the output of the filter produced at 103. The characteristics of the filter 102 are a function of the intermediate frequency qualities of the communications link and as such are a practical detail. Broadly, however, they are chosen in accordance with the observation that during a period of fade, aberrant data of all types is frequently received. Hence, filter 102 is designed such that output 103 is significant when aberrant data are frequently received.

It will be appreciated that the arrangement as described thus far, indicated as 104 in FIG. 1, comprises ADPCM apparatus in accordance with a particular embodiment of the present invention. Within a telephone hand set or base station receiver, however, the PCM decoded data on line 15 is fed to a digital to analog converter 105 to deliver an analog output 106 arranged to drive an earpiece, for example. Also present in cordless telephone receivers is an error analyzer 102 which is arranged to take corrective action within the receiver during a period of reception of corrupt data, or likely corrupt data. To this end, the analyzer typically receives as inputs the result of the cyclic redundancy check (CRC) 106 (from the data controller) and an input representative of received signal strength 109.

In the present embodiment, output 103 is fed as an additional input to error analyzer 107 which is arranged to take suitable corrective action in the event of a significant output from filter 102. To this end, error analyzer controls an output channel muting switch via an output 111. Such muting in response to a significant output from the filter 102 serves to reduce the squawk-in-fade problem described in the preamble of the present description. Alternatively, output 111 may control one or more interpolation switches, so then an aberrant value may be replaced with a value determined on the basis of other received data. In arrangements where interpolation is arranged to occur automatically if no data is received, the signal present at ADPCM input 10 may be muted thereby to cause interpolation. True audio muting 110 of the output may also be employed.

As will be recalled, ADPCM is essentially a process of producing a prediction of a PCM signal sample based on samples to date and transmitting only the error between the prediction and the sample, rather than the sample itself, thereby reducing the data to be transmitted. An inverse process is implemented in a receiver, that is the incoming datum is used to modify a value predicted by a predictive algorithm operating on received PCM data, theoretically to a correct value. During a period of corrupt data, however, the prediction and the true value may diverge to such an extent that the predictive algorithm has to be reset. To this end error analyzer controls reset of ADPCM decoder 14 via output line 112 as a possible response to a significant output of filter 102.

Thus far, the operation of PCM range limit comparators 16 and 18 has been considered only in the context of individual aberrant received data. With respect to ADPCM data, however, a particular characteristic of such data may be usefully exploited. As is known, in ADPCM, error values determined with respect to a predicted value makes up the transmitted data. For an appropriately specified predictive algorithm the predicted values will correlate well with the actual values; the transmitted error values being small therefore. Hence, statistically ADPCM values corresponding to low signal excitations are the most commonly transmitted. During corrupted communications, however, this will no longer be true and received values will be more randomly distributed. Hence, the frequency of reception of out of range values (as detected by comparators 16 and 18, for example) is increased.

Figure 2:
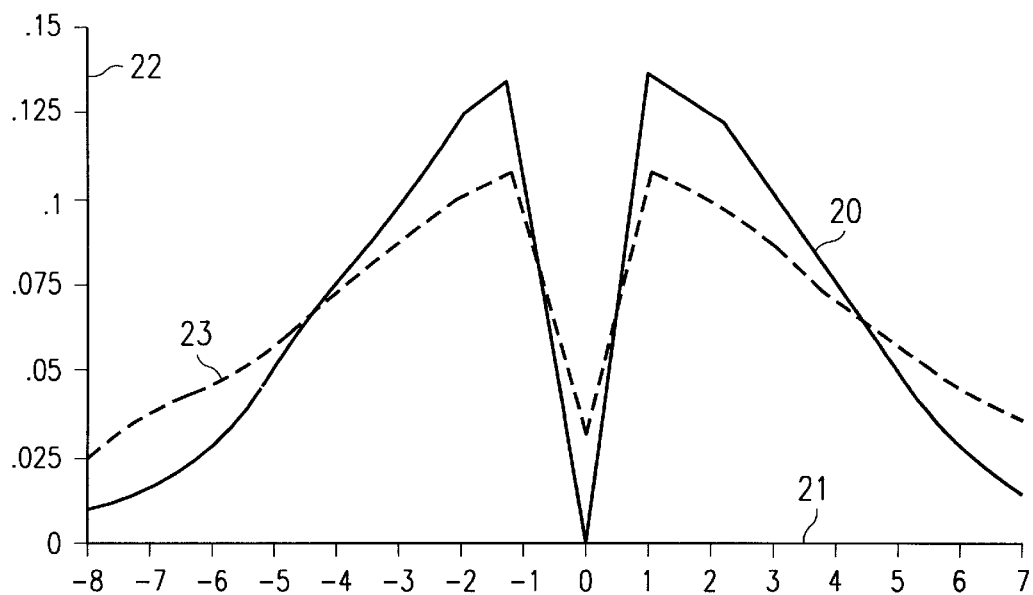
FIG. 2 shows a plot of probability of datum reception for ADPCM data.

For CT2 (CAI), a trace 20 (FIG. 2) of ADPCM value 21 plotted against the probability 22 of any single datum taking a specified value, the trace being representative of a relatively low error rate, shows a low probability both of 0 (the unassigned value in the standard considered) and of relatively high signal excursions, by far the majority of values being between ±1 and ±5. By contrast, a trace 23 in respect of a relatively higher communication error rate shows not only a significant probability of the aberrant datum value 0, but that the probability of high signal excursions is markedly increased. By extrapolation of this plot, it will be apparent that out of range values are significantly more likely if a high communication error rate, as would occur during fade for example, is encountered. Indeed, it will be noted that the trace 20 (relatively low error rate) and 23 (relatively high error rate) cross at approximately ADPCM value ±4. This implies that for some values, they are more likely to be due to communication error than correct reception, hence a high rate of reception of values above such a threshold would be indicative of communication channel errors.

Such ADPCM data values may be detected directly by operating on the ADPCM values themselves, for example by a comparator receiving ADPCM data from input 10 and feeding combiner 100. Typically two comparators, one for a high excursion and one for a low excursion would be employed. Alternatively, detection may occur following PCM decoding, with the comparison value set according to the PCM mapping and ADPCM prediction. For example, comparators 16 and 18 may be set for comparison with this likely aberrant value and the response of the filter 102 selected so that the output 103 becomes significant when the pulse rate of the combined comparator output exceeds the likely reception rate of such values.

It will be appreciated that a comparison with a likely aberrant value, as has just been described, may be employed in addition to a range limit comparison. Indeed, many variations of the present invention are possible and arrangements including a plurality of single value comparisons, range limit comparisons, and/or unlikely value comparisons are all within the scope of the invention. The outputs of such comparisons may be respectively weighted so that some are more likely to produce a significant output from the filter 102 than others. This may be conveniently achieved by arranging that relatively more significant comparator outputs, comparator 11 detecting an unassigned code for example, provide a longer pulse output than those which are relatively less significant. It will further be appreciated that whilst in the embodiment described above, the outputs of the comparators 11, 16 and 17 are all combined and are all subject to the weighting/integrating function of the low pass filter 102. It may be appropriate in some arrangements of the present invention to provide comparator output directly to the error analyzer 107.

As will be apparent to those skilled in the art, the present invention may be readily implemented by digital techniques, and it will be appreciated that the comparisons may be digital comparisons, the combination of outputs may be digital and that filter 102 may be a digital filter. Implementation may, for example be by means of a suitably programmed micro-computer or other digital circuitry such as hard wired logic.

A method of implementing the invention by means of such a micro-computer is described below by way of example only.

A variable, hereinafter referred to as ERROR, is defined in a program executed by the micro-computer and initially set to zero. Upon detection of an illegal ADPCM value (comparison 11), the current value of ERROR is incremented by 128. Upon detection of an out of range PCM output (comparisons 16,18), the current value of ERROR is incremented by 128. Once per data frame (in CT2(CAI) control data is inserted every 125 $\mu$S to frame the original data) the current value of ERROR is replaced by the computed value of the expression ERROR=ERROR*225/256, rounded down to the nearest integer value. In this way the variable ERROR contains a number proportional to the periodic error rate. A significant output to be supplied to the error analyzer 107 may be provided whenever the value of ERROR exceeds a predetermined threshold, for example 256.

It will be appreciated that the example described above provides a combination (100) of the error inputs on an equal basis. The method described is flexible, however, and other weighting may be achieved by relatively increasing or relatively decreasing the amount the variable ERROR is incremented when an aberrant value is detected. Experimental results suggest, for example, that it is appropriate to weight the detection of an illegal APCM value (comparison 11) more highly than detection of an out of range PCM value (comparisons 16, 18) even though the latter often gives a much worse audio effect to the listener.

The sensitivity of the arrangement may be set by selecting the value for the predetermined threshold, higher values decreasing sensitivity. Alternatively, the magnitude of the value of ERROR and/or its historical values may be acted upon by the error analyzer 107 to provide a selected response or responses, for example muting as previously described, interpolation (replacement of an aberrant value with one determined on the basis of other received data) or even predictor reset as previously described. Upon reset it is appropriate also to clear the value of ERROR to zero. Interpolation is suitable for low error rates over a short period of time whilst muting is appropriate to high error rates over a longer time.

Apparatus in accordance with the present invention may be formed as an integrated circuit. The apparatus may form part of a device of greater functionality. Equally, parts of the apparatus may be connected external to the integrated circuit. Advantageously, the apparatus is integrated with an ADPCM decoder and error analyzer.

What I claim is:

1. Decoding apparatus for decoding received encoded data comprising:

an input for receiving said encoded data;

a first comparator connected to said input for receiving said encoded data therefrom and comparing said received data with a predetermined value, said predetermined value being defined in relation to an aberrant or probably aberrant datum value;

an adaptive differential pulse code modulation decoder connected to said input for receiving said encoded data therefrom and providing a pulse code modulation signal as an output;

second and third comparators having inputs connected to the output of said adaptive differential pulse code modulation decoder;

said second comparator comparing the pulse code modulation signal provided from the output of said adaptive differential pulse code modulation decoder to the low value of a predetermined pulse code modulation value range;

said third comparator comparing the pulse code modulation signal provided from the output of said adaptive differential pulse code modulation decoder to the high value of said predetermined pulse code modulation value range;

a combiner connected to the outputs of said first, second, and third comparators for producing a single pulse train output having a pulse rate indicative of the frequency of aberrant data reception; and filtering means connected to the output of said combiner for producing an integrated filtered pulse train output signal.

2. Decoding apparatus as set forth in claim 1, further including an error analyzer connected to the output of said filtering means for receiving the integrated filtered output signal therefrom as in input, said error analyzer being connected to an input of said adaptive differential pulse code modulation decoder for providing a reset signal thereto whenever the output from said filtering means exceeds a predetermined threshold value;

the predetermined threshold value being defined in relation to an aberrant or probably aberrant datum value such that the output produced by said filtering means is indicative of an error or likely error in said received data in the event that, on the basis of a comparison by said first, second, and third comparators, an aberrant data value is or is likely to have been received as part of said received data.

3. Cordless telephone apparatus comprising:

an input for receiving encoded data;

decoding apparatus for decoding received encoded data, said decoding apparatus including:

an adaptive differential pulse code modulation decoder connected to said input for decoding received encoded data, means connected to said input for receiving said encoded data therefrom and comparing said received data with a predetermined value, said predetermined value being defined in relation to an aberrant or probably aberrant datum value, and said means being arranged to produce an output indicative of an error or likely error in said received data in the event that, on the basis of a comparison by said means, an aberrant data value is or is likely to have been received as part of said received data; and a digital-analog converter connector to the output of said adaptive differential pulse code modulation decoder for providing an analog output.

4. Cordless telephone apparatus as set forth in claim 3, further including an error analyzer connected to the output of said means for comparing, the output of said means for comparing providing an input to said error analyzer;

a muting switch for controlling an output channel and having inputs respectively connected to the outputs of said digital-analog converter and said error analyzer; and said output channel muting switch being responsive to an output from said error analyzer exceeding a predetermined threshold value to open the output of said digital-analog converter to mute the output channel, thereby preventing the occurrence of extraneous sound signals generated by said adaptive differential pulse code modulation decoder on the output channel.

5. Cordless telephone apparatus as set forth in claim 4, wherein said means for comparing comprises a first comparator connected to said input for receiving said encoded data therefrom;

said decoding apparatus further including second and third comparators having inputs connected to the output of said adaptive differential pulse code modulation decoder;

said second comparator comparing the pulse code modulation signal provided from the output of said adaptive differential pulse code modulation decoder to the low value of a predetermined pulse code modulation value range;

said third comparator comparing the pulse code modulation signal provided from the output said adaptive differential pulse code modulation decoder to the high value of said predetermined pulse code modulation value range;

a combiner connected to the outputs of said first, second, and third comparators for producing a single pulse train output having a pulse rate indicative of the frequency of aberrant data reception; and filtering means connected to the output of said combiner for producing an integrated filtered pulse train output signal for input to said error analyzer.

6. An integrated device comprising:

decoder apparatus for decoding received encoded data and including an input for receiving said encoded data and an ADPCM decoder connected to said input for receiving said encoded data therefrom;

means connected to said input for receiving said encoded data therefrom and comparing said received data with a predetermined value, said predetermined value being defined in relation to an aberrant or probably aberrant datum value, said means for comparing being arranged to produce an output indicative of an error or likely error in said received data in the event that, on the basis of a comparison by said means for comparing, an aberrant data value is or is likely to have been received as part of said received data;

an ADPCM error analyzer having an input connected to the output of said means for comparing and an output connected to an input of said ADPCM decoder for controlling the reset thereof; and said ADPCM decoder having an output connected to an input of said means for comparing for applying decoded data thereto.

* * * * *